Jan. 3, 1961   W. R. BATESOLE   2,966,947
FOLDING HELICOPTER BLADE
Filed July 21, 1958
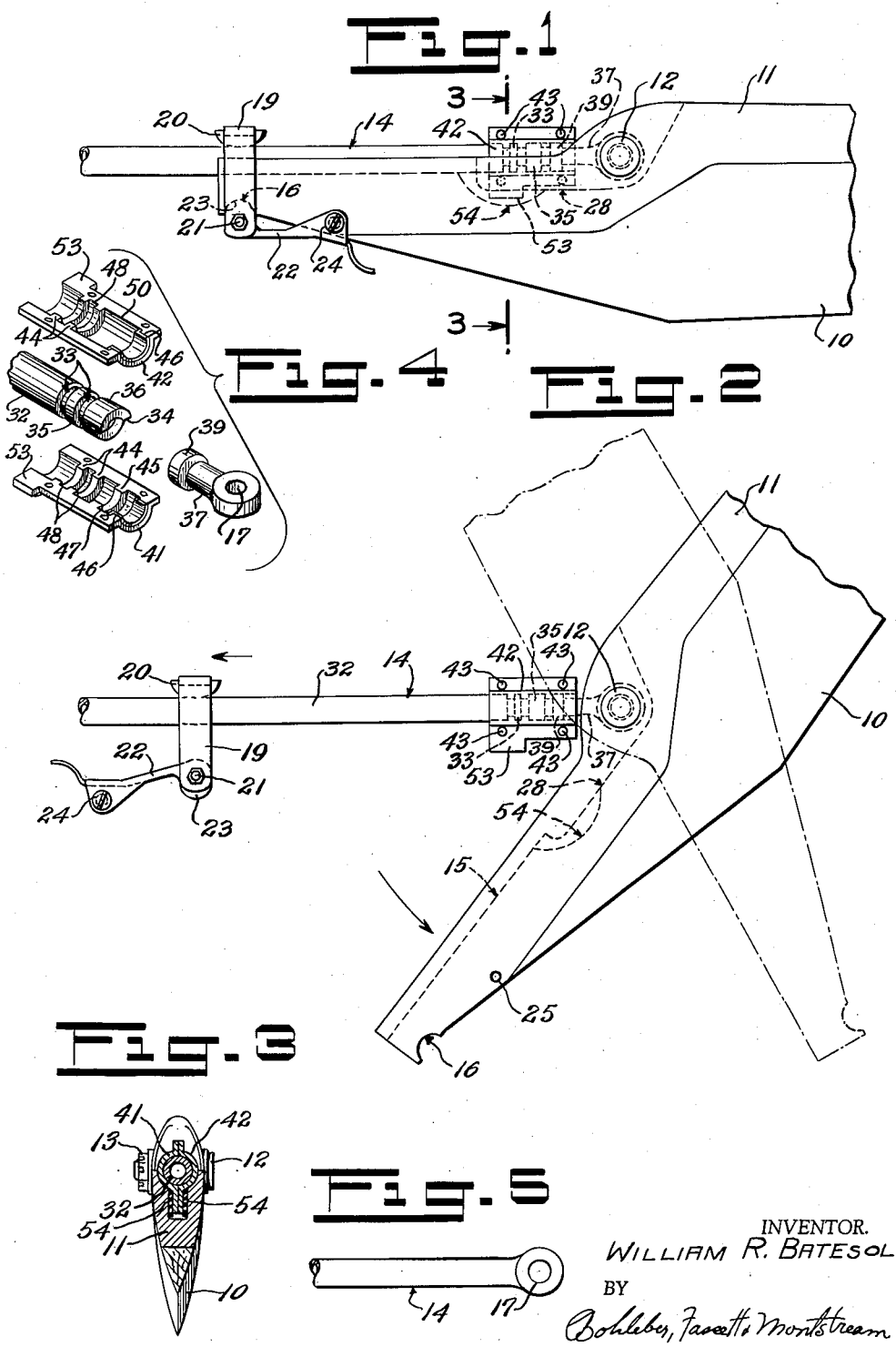
INVENTOR.
WILLIAM R. BATESOLE
BY
Bohleber, Fassett, Montstream
ATTORNEYS

United States Patent Office 2,966,947
Patented Jan. 3, 1961

2,966,947

FOLDING HELICOPTER BLADE

William R. Batesole, Ridgefield, Conn., assignor to Doman Helicopters, Inc., Danbury, Conn., a corporation of Delaware Filed July 21, 1958, Ser. No. 749,858

17 Claims. (Cl. 170—160.12)

The invention relates to a folding helicopter blade whereby a blade may be folded inwardly to reduce the outboard or overall dimension of a rotor. Usually in a multi-bladed head it is not necessary to fold one or two of the blades since one blade in a three bladed rotor may be moved over the fuselage and in a four bladed rotor any forwardly extending blade would be moved into alignment with the fuselage which may be a sufficient reduction in rotor storage dimension. If desired, of course, all blades may be foldable. A construction is also illustrated by which the blades on opposite sides of the rotor may be folded rearwardly.

It is an object of the invention to construct a folding blade for a helicopter rotor which is simple and effective.

Another object of the invention is to construct a folding blade in which the aerodynamic portion is pivotally mounted on the end of a blade spar so that the aerodynamic portion may be folded inwardly and providing simple means for locking the aerodynamic portion to the spar when the blade is extended.

A further object is as above in which the locking means, for locking the aerodynamic portion to the spar, is held in locked position by centrifugal force when the rotor head or blade is rotated.

A still further object is to construct a folding blade in which the aerodynamic portion of the blade may be folded in opposite directions as needed or desired.

Another object of the invention is as above in which means are provided to transfer torque pressures or loads between the aerodynamic portion and the blade spar of the blade.

Other objects of the invention will be more apparent from the following description when taken in connection with the accompanying drawings illustrating a preferred embodiment in which:

Fig. 1 shows the connection between the aerodynamic portion of a folding blade anchored in position to the outboard end of the blade spar;

Fig. 2 shows the aerodynamic portion of the blade released from the blade spar and pivoted on its pivot;

Fig. 3 is a section through the torque transfer means of the blade taken on line 3—3 of Fig. 1;

Fig. 4 is an exploded view of the coupling means between the blade spar and the aerodynamic portion of the blade; and Fig. 5 shows the outboard end of a one piece blade spar.

The blade includes an aerodynamic portion 10 including a spar 11 for the aerodynamic portion and forming a part thereof which is suitably secured to the blade airfoil. The aerodynamic portion spar has holes therethrough or particularly in spaced flanges carried thereby in which is received a pivot such as an axially extending pivot bolt 12 having a nut 13 on the end thereof. This pivot bolt also passes through a hole 17 in the outboard end of a blade spar 14. The pivot mounting is spaced outwardly from the inboard end and may be of any suitable form and the inboard end of the blade spar may be of any form. The aerodynamic portion spar preferably has a semicircular groove 15 extending lengthwise thereof from adjacent the pivot 12 and preferably facing in the direction of rotation to receive the cylindrical blade spar 14. The aerodynamic portion spar also has a crosswise locking groove 16 at the inboard end and shown as semicircular in form. The locking groove is at the trailing edge on the aerodynamic portion spar and is spaced from the pivot 12.

Locking means is provided to anchor or secure the inboard end of the aerodynamic portion to the blade spar 14 which means includes a U-shaped locking member 19 with the blade spar 14 received between the arms. A flexible nylon buffer 20 may be provided at the bottom of the U to engage the spar. The ends of the arms of the U-shaped member carry a locking lever pivot 21 on which is carried a locking lever 22 having a cam 23 in alignment with the pivot 21. In order to lock the aerodynamic portion to the blade spar, the aerodynamic portion is pivoted on the pivot 12 so that the blade spar 14 is received in the spar groove 15 of the aerodynamic portion. The locking means is then slid or shifted along the blade spar over the inboard end of the aerodynamic portion spar to bring the pivot 21 and cam 23 in alignment with the crosswise locking groove 16 whereupon rotation of the locking lever brings the locking cam 23 into the locking groove 16. The locking lever 22 is on the inboard side of the pivot 21 when unlocked and on the outboard side when the aerodynamic portion is locked to the blade spar. When the blade is rotating, centrifugal force retains the locking lever in locking position and against unlocking rotation.

Further assurance of inadvertent release of the locking means may be secured by passing a bolt or pin 24 through the locking lever 22 of a point spaced from the pivot 21 and through a cooperating hole 25 in the aerodynamic portion or particularly in the aerodynamic portion spar.

The blade spar may be a single member as shown in Fig. 5, however, in order to provide more effective folding such that the blade may be folded in either a clockwise or a counterclockwise direction, it is constructed in the form illustrated in detail in Fig. 4. In this construction the blade spar 14 includes two members, an inboard member 32 and an outboard or pivot member with coupling means to connect or secure the two parts together with the outboard or pivot member being rotatively or pivotally mounted in the coupling means on the axis of the blade spar. The inboard member has at least one groove 33 at the end thereof, two being shown which form collars 35 and 36. At the end of the inboard member is a shoulder 34 particularly shown as formed by making the extreme end of the inboard member semicircular in form. The blade spar also includes an outboard member 37 having a hole 17 to receive the folding pivot or pivot bolt 12. This outboard member has a collar 39 at the end thereof which provides an adjacent cooperating groove in effect which receives the half collars 46 of the coupling means.

The two members of the blade spar are coupled together by coupling means which includes a pair of coupling plates 41 and 42. Bolts 43 pass through the flanges of the plates and secure the two plates over the ends of the inboard member 32 and the outboard member 37. The coupling plate 41 has a bore to receive the end of the inboard spar member and this bore has one or more grooves 48, one being provided for the collar 35 and the other being for the collar 36 on the end of the inboard spar member. The grooves 48 provide an inner half collar or collars 44. The coupling plate 41 also has inner half collars 45 and 46 formed by a groove 47. The coupling plate 42 has similar inner half collars 44 formed by a groove 48. When the coupling plates are assembled together the half collars 44 form full collars to secure the end of the inboard member to the coupling means. It will be noted therefore that there are cooperating collars and grooves in the members of the blade spar and in the coupling means to secure the two members together in the manner described.

Means are provided for torque anchorage or transfer between the coupling means and the outboard end of the inboard spar member 32. This means is partly provided by the coupling plate 42 having a wide or long groove 50, that is it lacks the inner half collar 45 of the coupling plate 41. The torque transfer means includes the shoulder 34 and the ends of the half collar 45. A similar inner half collar 46 is provided in the coupling plate 42. The half collars 46 may have bearing liners if desired.

With the coupling plates secured together and receiving the ends of the inboard spar member 14 and the outboard spar member 37, the collars 35 and 36 are received in the grooves 48 and 50 respectively for retaining the inboard spar member within the coupling. The shoulder 34 on the inboard member, however, engages the ends of the half collar 45 since the projecting end of the collar 36 is received in the wide groove 50 of the coupling plate 42. This provides torque transfer or non-rotation between the inboard spar member and the coupling means.

The collar 39 of the outboard or pivot member 37 is received in the groove 47 and the groove 50 to rotatably retain the outboard or pivot member 37 within the coupling. The end of the collar 36 is in alignment with the right hand end of the collar 45 so that the groove 47 and that portion of the groove 50 which is not filled by the projecting or semicircular end of the collar 36 of the inboard spar member, makes a continuous circular groove in the coupling to rotatably receive the collar 39 of the pivot member. The outboard member, therefore, is retained within the coupling means but has free rotation therein.

In order to transfer torque loads between the inboard member 32 of the blade spar and the aerodynamic portion, a flange or both flanges on one side of the coupling plates may be received in a slot 28 in the aerodynamic portion spar 11. Because of the bolts 43, however, it is deemed desirable to have at least one of the coupling plates, and as shown both coupling plates, carry a tang or tongue 53. This tang is received in a slot 54 in the aerodynamic portion spar 11 so that torque load between the coupling means and the aerodynamic portion is transferred from one to the other through the tangs. The tangs or tongues may have a flexible liner if desired for engagement with the sides of the slot 54. The means for transferring torque loads between the inboard member of the blade spar and the aerodynamic portion includes the shoulder 34 and the ends of the half collar 45 and the flanges or tang of the coupling means and the slot 54.

The construction shown and described locates the coupling with its complex sections of grooves and collars and parts which cause stress concentrations are at the outboard end of the blade spar where the induced vibratory stress is a minimum. The vibratory stress on the blade spar increases towards the inboard end and the U-shaped locking member 19 performs its locking function at a point between the ends of the spar without any change in the smooth continuity of the tubular spar at this point where vibratory stresses are relatively high. Furthermore the locking lever introduces a simple reaction only without a local force couple or other stress disturbance which could be substantial. Also when folding the blade of Figure 1, the connection for transmission of torque between the spar and airfoil portion is disconnected which protects the pitch horn and blade control system when folding and recoupling a blade as well as when the blade is folded.

With the construction described the blade on the left hand side of the fuselage may be folded rearwardly and inwardly in a counterclockwise direction merely by releasing the locking means and swinging the blade around on the pivot 12. For clockwise folding of the blade, the aerodynamic portion is pivoted initially in a counterclockwise direction on the pivot 12 far enough to release the tangs or tongues 53 from the engaging slot in the aerodynamic portion spar and from any interference with the aerodynamic portion spar. Then by looping or circling the end of the blade downwardly or upwardly and in a clockwise direction to rotate the aerodynamic portion through 180°, which is permitted by the rotation of the outboard or pivot member 37 of the blade spar, whereupon the blade may be swung clockwise inwardly or towards the fuselage of the helicopter. In this way the blade on the right hand side of the fuselage may be swung inwardly in a rearward direction.

This invention is presented to fill a need for improvements in a folding helicopter blade. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is.

1. A folding helicopter blade comprising an aerodynamic portion including an aerodynamic portion spar having an inboard end, a blade spar having an outboard end and a longitudinal axis, pivot means extending laterally with respect to the axis of the blade spar and pivotally connecting the outboard end of the blade spar with the aerodynamic portion spar at a point spaced outwardly from the inboard end of the latter, and securing means to anchor the inboard end of the aerodynamic portion spar to the blade spar spaced inwardly a substantial distance from the outboard end of the latter.

2. A folding helicopter blade as in claim 1 in which the securing means is mounted for slidable movement axially on the blade spar.

3. A folding helicopter blade as in claim 1 in which the securing means includes a U-shaped clamping member receiving the blade spar between the arms of the member, a locking lever, a lever pivot pivotally mounting the locking lever on the clamping member, a locking cam carried by the clamping lever, and a locking groove extending crosswise of the aerodynamic portion spar at the inboard end of same and receiving the locking cam upon pivoting of the lever.

4. A folding helicopter blade as in claim 3 in which the locking lever cam projects towards the blade spar with the lever extending outwardly.

5. A folding helicopter blade as in claim 3 including a locking pin received in the locking lever and the aerodynamic portion spar.

6. A folding helicopter blade comprising an aerodynamic portion including an aerodynamic portion spar having an inboard end, a blade spar having an outboard end and a longitudinal axis, pivot means extending laterally with respect to the axis of the blade spar and pivotally connecting the outboard end of the blade spar with the aerodynamic portion spar at a point spaced from the inboard end of the latter, securing means to anchor the inboard end of the aerodynamic portion spar to the blade spar spaced inwardly a substantial distance from the outboard end of the latter, the blade spar including an inboard spar member and an outboard spar member providing the outboard end and receiving the pivot means, and coupling means connecting the members together for rotation of the outboard spar member in the coupling means on the longitudinal axis and for transfer of torque between the inboard member and the aerodynamic portion spar, and the coupling means being adjacent to the pivot means.

7. A folding helicopter blade as in claim 6 in which the coupling means includes a pair of coupling plates, means to secure the coupling plates together, means carried by the inboard spar member and the coupling plates to axially and non-rotatively retain the inboard spar member within the coupling means, means carried by the coupling plates and the outboard spar member to rotatably secure the latter in the coupling means, and torque transfer means carried by the inboard spar member, the coupling means and the aerodynamic portion spar.

8. A folding helicopter blade as in claim 7 in which the means for retaining the inboard spar member in the coupling means includes at least one collar on the inboard spar member, and a cooperating groove for each collar carried by the coupling means.

9. A folding helicopter blade as in claim 7 in which the means for retaining the inboard spar member non-rotatively in the coupling means includes a half collar carried by one of the coupling plates having edges, and a shoulder carried by the inboard spar member engaging the edges of the half collar.

10. A folding helicopter blade as in claim 7 in which the means for retaining the inboard spar member non-rotatively in the couplng means includes a collar on the inboard spar member having a shoulder, a cooperating groove in the coupling means receiving the collar, a half collar carried by one of the coupling plates having ends and the shoulder engaging the ends of the half collar.

11. A folding helicopter blade as in claim 7 in which the means for retaining the inboard spar member in the coupling means includes a pair of spaced collars on the inboard spar member, a shoulder carried by one of the collars, a cooperating groove carried by the coupling plates for each collar, and a half collar carried by one of the coupling plates having ends and the shoulder engaging the collar ends.

12. A folding helicopter blade as in claim 7 in which the means for rotatively securing the outboard spar member includes a collar carried by the latter, and a cooperating groove carried by the coupling means receiving the collar.

13. A folding helicopter blade as in claim 7 in which the means for retaining the inboard spar member in the coupling means includes a collar on the inboard spar member, a shoulder carried by the collar, the coupling means having a cooperating groove receiving the collar, a half collar carried by one of the coupling plates having ends, the shoulder engaging the ends of the half collar, and in which the means for rotatably retaining the outboard spar member in the coupling means includes a collar carried by the outboard spar member, and the coupling means having a cooperating groove receiving the outboard spar member collar.

14. A folding helicopter blade as in claim 11 in which the means for rotatively securing the outboard spar member in the coupling means includes a collar carried by the outboard spar member, and the coupling means having a cooperating groove receiving the outboard spar member collar.

15. A folding helicopter blade as in claim 7 in which the torque transfer means for the coupling means includes flanges carried by the coupling plates, and a slot in the aerodynamic portion spar receiving at least one flange.

16. A folding helicopter blade as in claim 7 in which the torque transfer means for the coupling means includes flanges, a tongue carried by at least one flange and a slot in the aerodynamic portion spar receiving the tongue.

17. A folding helicopter blade as in claim 7 in which the means for retaining the inboard spar member within the coupling means includes at least one cooperating collar and groove carried by the inboard spar member and the coupling means, and the means for rotatively mounting the outboard spar member within the coupling means includes a cooperating collar and groove carried by the outboard spar member and the coupling means.

References Cited in the file of this patent

UNITED STATES PATENTS 2,405,777　　Buivid _____ Aug. 13, 1946

UNITED STATES PATENT OFFICE
CERTIFICATION OF CORRECTION

Patent No. 2,966,947                      January 3, 1961

William R. Batesole

It is hereby certified that error appears in the above numbered patent requiring correction and that the said Letters Patent should read as corrected below.

Column 4, line 63, after "spaced" insert -- outwardly --.

Signed and sealed this 30th day of May 1961.

(SEAL)
Attest:

ERNEST W. SWIDER                      DAVID L. LADD
Attesting Officer                      Commissioner of Patents